April 15, 1969     N. R. PARKS     3,439,339
SYSTEM FOR VERIFYING THE OWNERSHIP OF A CREDIT CARD, AN
IDENTIFICATION CARD, OR THE LIKE
Filed April 15, 1966

*INVENTOR,*
Nathan R. Parks,
BY
ATTORNEY.

United States Patent Office 3,439,339
Patented Apr. 15, 1969

3,439,339
SYSTEM FOR VERIFYING THE OWNERSHIP OF A CREDIT CARD, AN IDENTIFICATION CARD, OR THE LIKE
Nathan R. Parks, Long Beach., N.Y., assignor of one-half to Lawrence M. Parks, Lynbrook, N.Y.
Filed Apr. 15, 1966, Ser. No. 542,942
Int. Cl. G07c 11/00
U.S. Cl. 340—149        10 Claims The present invention relates to, and its principal object is to provide, a novel and improved system for verifying the ownership of a credit card, an identification card and the like.

This invention contemplates that the cards issued by a credit agency to be honored by vendors of goods or services, or identification cards issued by an industrial plant to be shown to a door keeper, shall be perforated within a given section thereof, in accordance with a code, so upon presentment of a card, the holder shall announce his code number to the cashier or door keeper as the case may be, who has at hand an optical device into which the card is then inserted. Upon closing a lamp circuit which may automatically occur because of card movement to a fixed location within the casing of said device, numerals determined by the card's perforations will appear on a screen visible only to the checker. The screen reading should match the announced number. If it does not, then the holder of the card shall be deemed not to be the owner thereof.

Another object of this invention is to provide a novel and improved optical device for this system, which will show the code numerals on the screen, clearly, brightly, and large as compared to perforation size.

Still a further object thereof is to provide a novel and improved system of the character described, employing equipment which is simple in construction, reasonable in cost to manufacture, easy to use, automatic in action, and efficient in carrying out the purposes for which it is designed.

Other objects and advantages will become apparent as this disclosure proceeds.

The choice of a code determines the make up of a stencil or slide having numerals thereon. The perforations in a card will determine which of these numerals will be projected on the screen of the optical device when the card is being checked.

One embodiment of the optical device for the practice of this invention, comprises a casing having a card-receiving holder between a concentrated light source therewithin, and the viewing screen which is a window. A stencilled or printed slide having numerals thereon in a chosen arrangement, is against the inside surface of the screen. The height of these numerals is a few times the diameter of perforations in the card. The optical arrangement produces spotlights to illuminate the numbers on the slide which indicate the code number of the card, when the card is inserted in proper position into the casing. Dimensions and relative positions of the parts of the optical device are chosen to accomplish proper operation, as will be explained.

A detailed description will now be given of the system taught herein as well as various incidental features of structure for its optical device, for which I will refer to the accompanying drawing forming part of this specification, in which drawing, similar characters of reference indicate corresponding parts in all the views.

Figure 1:
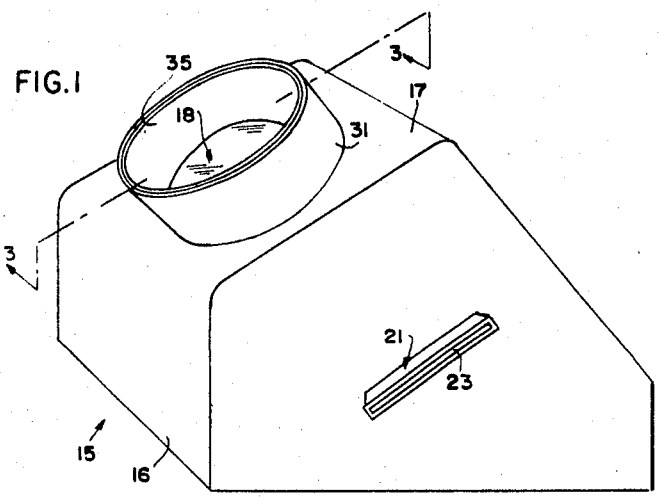
FIG. 1 is a perspective view showing an optical device for the practice of this invention.
Figure 2:
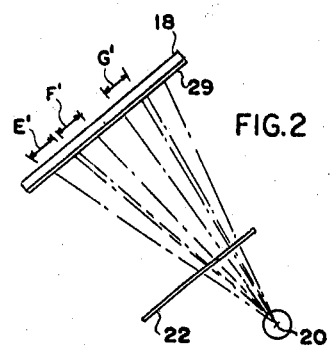
FIG. 2 is a diagrammatic view showing the working of the optical device, when a card is inserted therein.
Figure 3:
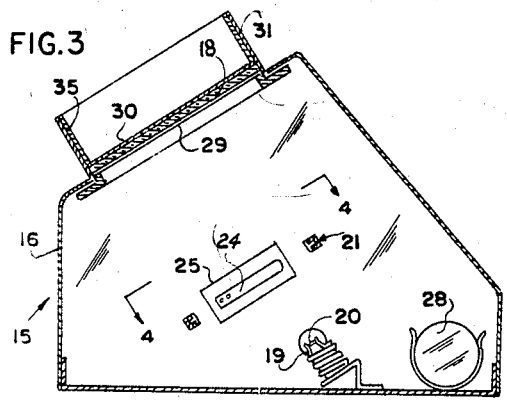
FIG. 3 is a section taken at line 3—3 in FIG. 1.
Figure 4:
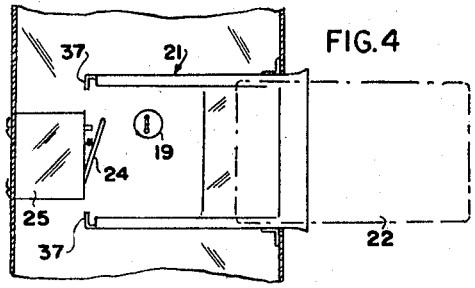
FIG. 4 is a section taken at line 4—4 in FIG. 3.

In the preferred embodiment shown in the drawing, the optical device indicated generally by the numeral 15, comprises a casing 16 of opaque material, having an upwardly rearwardly slanted front wall 17 in which there is a window whose translucent pane 18 serves as the screen to have spot lights projected thereon from an electric light bulb 19, which is directly opposite it and away therefrom within said casing. The filament 20 of said bulb is extremely short, so the light source emanates from nearly a point, or as near to a point as is possible, and it is centrally positioned in relation to said screen 18. Within said casing, intermediate the bulb and screen, is a track means designated generally by the numeral 21, which is adapted to receive and hold a card to be examined, in a plane parallel to said screen 18. The card 22 is partially inserted through the entrance slot 23 in a side wall of the casing 16, to lie in said track means, and it is permitted only a limited movement into the casing, whereupon its leading edge meets and moves the spring-biased operating member 24 of a normally open microswitch 25, to cause the said switch to assume closed condition and thus close the circuit 26 of the bulb 19, which is powered by a dry cell 28 which is also housed in the casing. The numeral 37 indicates stops to limit card movement into the casing.

Figure 6:
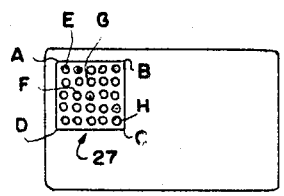
FIG. 6 is a face view of a card perforated in a manner so when inserted into the optical device of FIG. 1, all the numerals of the film will be flashed on the screen.
Figure 5:
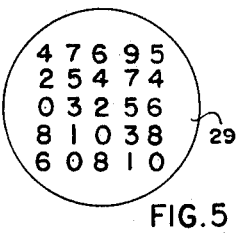
FIG. 5 is a face view of the printed film, from whose numerals, a card will select which of them will be flashed on the screen.
Figure 9:
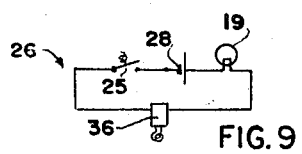
FIG. 9 is a wiring diagram of the bulb circuit.
Figure 10:
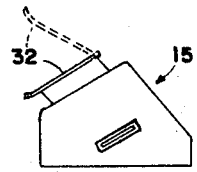
FIG. 10 is a reduced side view of a slightly modified optical device.
Figure 7:
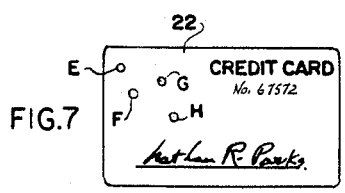
FIG. 7 is a face view of a card having perforations so positioned that when such card is inserted into the optical device, selected numerals indicating its code number, will be flashed on the screen.

The practice of this invention requires the choosing of a pattern containing all the possible positions for perforations to occupy within a prescribed section of a card. Each card issued shall be provided in the prescribed section with a few perforations at selected positions contained in such pattern. The pattern for example, may be as shown in FIG. 6, and designated generally by the numeral 27 therein, to consist of five parallel rows of five perforation positions in each row, within the prescribed square area whose vertices are indicated by the points A, B, C and D. The perforations in an issued card 22, may be those indicated by the letters E, F and G.

Also required is a stencil or printed transparent slide 29. This is preferably positioned against the underside of the screen 18, and presents numerals arbitrarily chosen, but arranged in accordance with the pattern 27. To hide the slide from view while the bulb 19 is dark, the outer surface of the screen 18, may have a thin film of silver 30 thereon, to be a transparent mirror when the bulb is lit. To hide the screen from view when the bulb is lighted, except to the checker, it may be surrounded by a shroud 31. Of course, the device 15 is positioned so the screen 18 faces the checker. If desired, the screen may be additionally shielded by having a manually-operated shutter 32 across the shroud's mouth, to be opened by the checker when a reading is to be taken.

Figure 8:
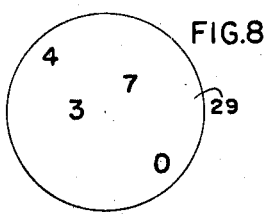
FIG. 8 shows the screen when the card of FIG. 7 is inserted into the optical device.

In the optical device 15, the light source shall be concentrated and come from practically a point, and that the plane of the card 22 when placed in the casing 16, shall be at such respective distances from the light source and the screen 18, that the separate cones of light E', F', G' passing through the perforations E, F, G respectively, shall throw the respective spot lights E", F", G", one each onto the area encompassing only one number on the slide 29. Hence the light passing through the perforation E, will illuminate the area encompassing the numeral "4," which is the first numeral in the first row of the slide. The light passing through the perforation F, will illuminate the area encompassing the numeral 3, which is the second numeral in the third row of the slide. The light passing through the perforation G, will illuminate the area encompassing the numeral "7," which is the fourth numeral in the second row on said slide. So the code number for this particular card 22, is 437 as is shown in FIG. 8. The person checking this card, would see such number 437 on the screen.

All cards issued are provided with some of the pattern positions perforated, and the bearers shall be apprized respectively of their code numbers. If desired, the number zero when it appears on the screen, may be agreed upon as having no significance, and shall be deemed mere fillers or dummies, so each card may include perforations which would show zero on the screen, in order that each card shall have more perforations than is necessary for the code number; one such being shown at H, which would cause the zero which is the last numeral in the last line of the slide, to be illuminated.

The spot lights appearing on the screen 18, are preferably spaced a bit from each other, and in all events it is desirable that they shall not overlap, if adjacent to one another, so only the numerals to appear on the screen, are within spotlights respectively. A practical size for the numerals on the slide, is that each be of a height of ⅜ of an inch. Suggested dimensions are as follows, to attain such performance. The pattern area ABCD is approximately a ⅞ inch square. Perforation diameter is ⅛ inch. Distance from the filament 20 to the card plane in the casing, is 1½ inches. Distance from said plane to the screen 18, is three inches. Distance between centers of the numerals on the slide 29, is twice the distance between centers of perforation locations in the pattern 27. The light source should be concentrated. The best condition is to have the light emanate from a point, or from nearly a point. It is found that a flash light bulb 19, having a filament 20 which is not more than about two millimeters in length, serves the present purpose, and such dimension, a bit more and better if less, shall be deemed a light source as emanating from substantially a point. Of course, the intensity of the light offered by the light source into the dark chamber which is the interior of the casing 16, shall be sufficient to reach the screen 18 with sufficient brightness.

The card issuing agency may issue new cards at the beginning of each calendar year, and change the slides at such time so the numbers at pattern positions are changed. For such purpose, the retaining ring or liner 35 is removable with a suitable tool, to make such replacement.

A plurality of card holders may have the same code number, but each may have a different number of zero "fillers." For further protection against unauthorized use of an optical device 15, the circuit may include a key switch 36, the key to which is on the person of the checker, who closes the key switch while he is on duty, or keeps it open while the device 15 is not being operated.

I claim:
1. In a system for verifying a number announced by the presenter of a credit card, an identification card and the like, which is one of a series of cards of identical dimensions having differently positioned perforations of identical dimensions within an area of identical dimensions and position on each card, the perforations of all the cards being included in a predetermined pattern of perforation positions, an optical device including a casing whose interior is dark; a wall of said casing having a window provided with a viewing screen through which light can pass, a minutely concentrated light source within the casing, offered by an electric bulb in a circuit, directing the light emanating therefrom, onto the screen, support means associated with the casing for holding at least part of a card within the casing in a plane between the light source and the screen so that area of the card is within the casing and unobstructed; said casing having an opening to admit a card therein onto said support means, a stop for limiting the movement of the card into the casing, and a slide positioned within the casing intermediate said plane and screen, having numerals thereon in an arrangement corresponding with the perforation positions of said pattern; the ratio of the distance between said plane and the slide and the distance between said plane and the light source, being substantially the same as the ratio of the height of the largest of said numerals and the diameter of a perforation; said screen being at such distance from the light source that said light source has a cone of light therefrom pass through each perforation in the card respectively, through the slide and onto the screen; said light source thereby producing separately discernable spot lights on the screen; each cone of light projecting only one numeral within such spot light on the screen when a card is placed within the casing on said support means and against said stop; corresponding points on the slide and on said area of a card on the support and against the stop, being in alignment with the light source.

2. A system as defined in claim 1, wherein the slide is in contact with the screen.

3. A system as defined in claim 1, wherein a surface of the screen is thinly coated with silver through which light from the light source can pass.

4. A system as defined in claim 1, including a normally open switch interposed in said circuit; said switch having an operating member; said operating member being in the path of the card being entered into the casing; said card shifting said operating member when inserted into the casing and against said stop, whereby said switch is closed; said operating member being biased to return to a normal rest position whereby said switch is opened, when the card is withdrawn from the casing.

5. A system as defined in claim 4, including a key-operated switch in series with the normally open switch; the key for operating said key-operated switch being removable therefrom.

6. A system as defined in claim 1, including a member on the casing, shielding the screen from all persons except one directly in front thereof; the screen being on a front wall of the casing.

7. A system as defined in claim 1, including a normally closed shutter shielding the screen, and when open, to shield the screen from all persons except one directly in front thereof; the screen being on a front wall of the casing.

8. A system as defined in claim 1, wherein the screen is on a front wall of the casing; said wall slanting upwardly rearwardly, and also including a tubular member encompassing the screen and extending from and exteriorly away from the casing.

9. A system as defined in claim 1, wherein the slide is in contact with the screen, the largest height of numerals on the slide is three times the diameter of a perforation, and the distance between the mentioned plane and the screen is twice the distance between the light source and said plane.

10. A system as defined in claim 1, wherein the perimeter of the pattern determines a square so the mentioned area common to all the cards as to the position thereof thereon, is a square, the center of which and the center of the screen, are in alignment with the light source when a card is inserted into the casing, resting on the support means and bearing against said stop.

References Cited

UNITED STATES PATENTS

| 3,015,087 | 12/1961 | O'Gorman | 340—149 |
| 3,315,230 | 4/1967 | Weingart | 340—149 |

DONALD J. YUSKO, *Primary Examiner.*